United States Patent [19]

Ito

[11] 4,229,770

[45] Oct. 21, 1980

[54] METHOD OF RECORDING ON A MAGNETIC TAPE WHICH IS ATTACHED TO A CARD

[75] Inventor: Takamasa Ito, Yokohama, Japan

[73] Assignee: Sony Corporation, Tokyo, Japan

[21] Appl. No.: 8,767

[22] Filed: Feb. 2, 1979

[30] Foreign Application Priority Data

Feb. 10, 1978 [JP] Japan .............................. 53/13416

[51] Int. Cl.² .............................................. G11B 5/86
[52] U.S. Cl. ................................................... 360/15
[58] Field of Search ....................................... 360/15

[56] References Cited

U.S. PATENT DOCUMENTS 3,889,292  6/1975  Bocek .................................. 360/15

OTHER PUBLICATIONS

"Magnetic Record Copying and Verification", Carey, IBM Tech. Disc. Bull., vol. 14, No. 1, Jun. 1971, p. 39.

Primary Examiner—Robert S. Tupper
Attorney, Agent, or Firm—Hill, Van Santen, Steadman, Chiara & Simpson

[57] ABSTRACT

A recording method for a magnetic tape attached to a card is provided in which an audio signal from a master recorder is pulse coded by a PCM conversion circuit and stored in a solid memory of a predetermined capacity, and the stored signal is read repetitively by a control signal, then converted into an analog audio signal and recorded on one of the channel tracks of the magnetic tape in the slave side recorder while a cue signal formed at a predetermined timing in correspondence to the audio signal is recorded repetitively on the other channel track of the magnetic tape.

5 Claims, 2 Drawing Figures

METHOD OF RECORDING ON A MAGNETIC TAPE WHICH IS ATTACHED TO A CARD

BACKGROUND OF THE INVENTION

1. Field of the Invention:

This invention relates to a method of recording on a magnetic tape attached to a card in which an audio signal of an analog quantity to be recorded is first PCM converted and stored in a solid memory in a pulse form and then this pulse coded signal is read at high speed, again converted into an analog audio signal and dubbed at high speed to the slave tapes by a plural number of tape recorders.

2. Description of the Prior Art:

There is known an audiovisual teaching machine, or so-called "card recorder", in which a magnetic tape having recorded thereon the commentary voices is attached to each card carrying a picture, letter, character, etc., and such magnetic tape is run in contact with the reproducing head of a tape recorder so that the student can learn a language by seeing the picture, letter, etc., while hearing the voice explaining such picture, letter, etc. The cards having attached thereto said magnetic tapes and carrying the same contents of expression are prepared in plurality, and hence there are accordingly required a plurality of magnetic tapes having the same recording contents. Heretofore, a plural number of endless tapes carrying the recorded voices of the same contents have been run continuously so as to reproduce the voices at a period of about 10 seconds and the reproducing outputs thereof have been recorded continuously and at high speed by a single or plural tapes. According to such conventional practice, however, since each endless tape with a length of approximately one meter is run repetitively for reproduction, there would inevitably take place the deterioration of sound quality due to wear of the tape or deposition of dust and variation of the reproducing output level due to dust deposition and other causes as well as wear of the magnetic head and other mechanical parts in use, so that constant watch and other troublesome works were required for maintaining the quality of the magnetic tape and timbre of the reproduced sound. Also, such endless tape was subject to a certain limitation in high speed dubbing for the mechanical reasons of the tape recorder.

SUMMARY OF THE INVENTION

An object of this invention is to provide a recording method for a magnetic tape attached to a card, which method allows dubbing of the audio signal of a master tape with no need of using a tape recorder for endless tapes.

Another object of this invention is to provide a card attached magnetic tape recording method which causes no wear of the master tape and the magnetic head of the master recorder.

Still another object of this invention is to provide a recording method for a magnetic tape attached to a card which has high reliability and requires no maintenance.

Yet another object of this invention is to provide a recording method for a magnetic tape attached to a card, whereby the audio signal of the master tape can be dubbed at high speed.

A further object of this invention is to provide a recording method for a magnetic tape attached to a card, whereby it is possible to obtain the dubbed magnetic tapes with excellent recording and reproducing characteristics.

An additional object of this invention is to provide a recording method for a magnetic tape attached to a card, whereby a plurality of dubbed magnetic tapes with high quality and excellent recording and reproducing characteristics can be obtained at high speed.

Still another object of this invention is to provide a recording method for a magnetic tape attached to a card, whereby the cards having attached thereto a magnetic tape with excellent sound quality can be mass-produced with ease at high speed.

Other objects of this invention will become apparent as the description of the preferred embodiments of this invention proceeds hereinbelow with reference to the accompanying drawings.

DESCRIPTION OF THE PREFERRED EMBODIMENTS

Figure 1:
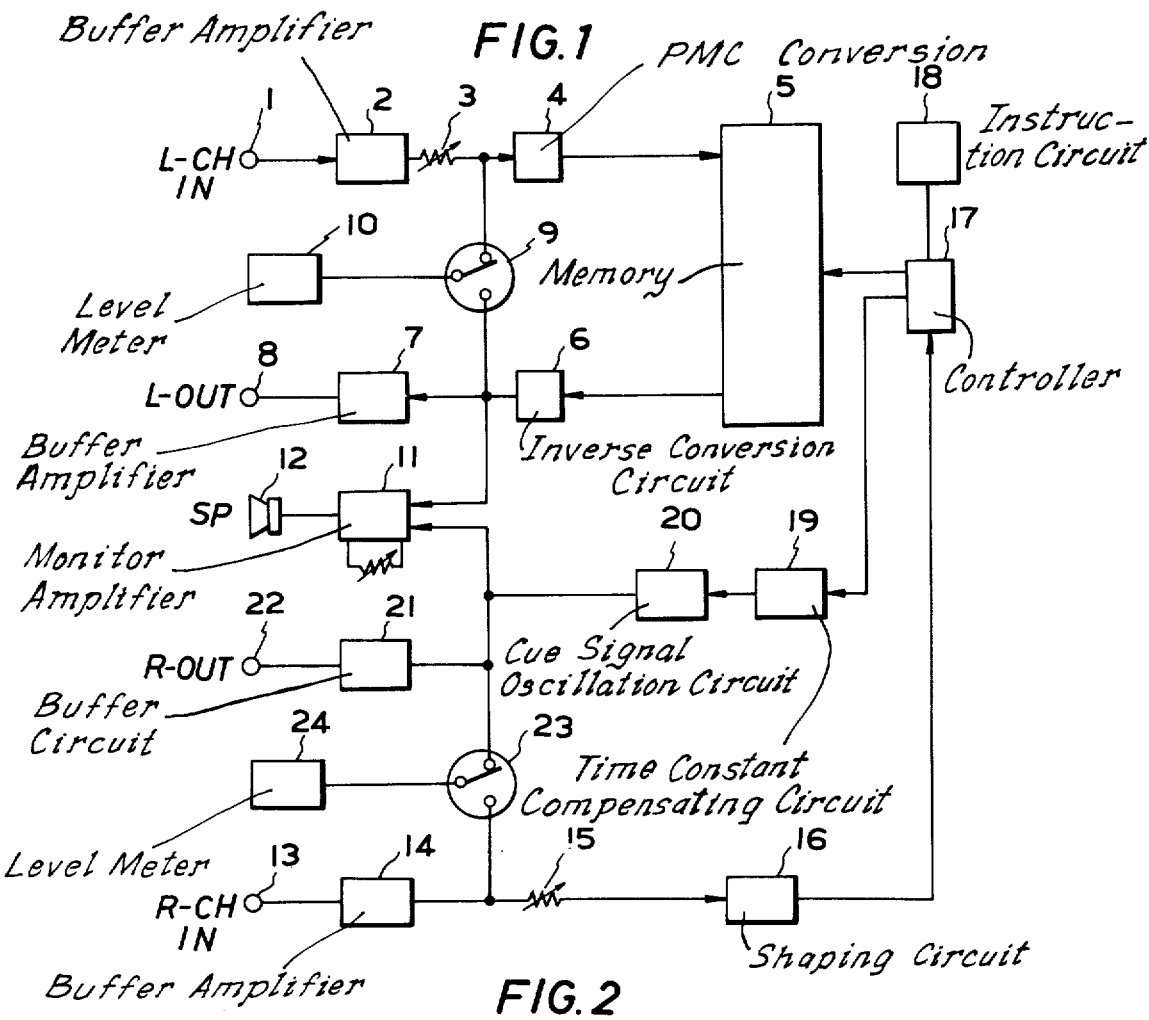
FIG. 1 is a block diagram illustrating a magnetic card recording method according to this invention.

Referring to FIG. 1, there is shown a block diagram showing the respective elements for making recording on a magnetic tape to be attached to a magnetic card, wherein numeral 1 indicates an input terminal for receiving the audio signal from a master recorder to be recorded on one of the channel tracks of a slave tape, 2 a buffer amplifier, and 3 a variable resistor for adjusting the input level of the audio signal to be recorded. Connected to said variable resistor 3 is a PCM conversion circuit 4 whereby the audio signal, or analog information, is converted into a pulse code. Said PCM conversion circuit 4 is connected to a solid memory 5 which stores the pulse coded audio signal. Said solid memory 5 is provided with a means for reading the pulse coded signal by a controller and is also connected on its output side to an inverse conversion circuit 6 whereby the pulse coded signal is converted into an analog signal. Said inverse conversion circuit 6 is connected on its output side to a buffer amplifier 7 and thence to an output terminal 8 for feeding the audio signal to the slave side recorder. Numeral 9 denotes a switch disposed between the input side side of said PCM conversion circuit 4 and the output side of said inverse conversion circuit 6 for selectively monitoring the level of the input signal given to the input terminal 1 and the reproducing signal from the inverse conversion circuit 6. Said switch 9 is connected to a level meter 10. It will be also seen that a monitoring speaker 12 is connected to the output side of said inverse conversion circuit 6 through a monitor amplifier 11.

Numeral 13 refers to an input terminal for feeding control signal, said input terminal 13 being connected through a buffer amplifier 14 and a sensibility adjusting variable resistor 15 to a shaping circuit 16 which is in turn connected to the input terminal of a controller 17. This controller 17 operates to generate a control pulse of a predetermined level and frequency according to the instruction from an instruction circuit 18 in the operation panel, and said control pulse is supplied to the solid memory 5. Connected to the output side of said controller 17 is a time constant compensating circuit 19 which is connected on its output side to a cue signal oscillation circuit 20. The cue signal from said oscillation circuit 20 is supplied via a buffer circuit 21 to an output terminal 22 as a signal to be recorded on the other channel track of the slave tape. Numerals 23 and 24 designate a level monitoring switch and a level meter, respectively, which are of the same construction as those mentioned before. To said output terminals 8 and 22 are connected the respective recording input terminals for the two channels of the slave side recorder.

Now, the method of making recording on said slave tape is decribed in detail with relation to the circuitry in the shown block diagram.

Figure 2:
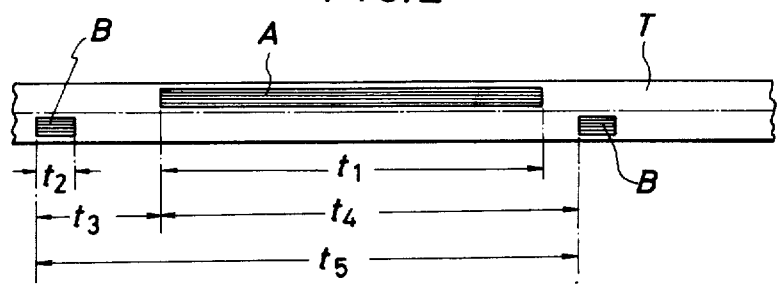
FIG. 2 is a drawing showing a recording pattern for a magnetic tape attached to a card recorded according to a method of this invention.

First, a master recorder is prepared and the master tape having recorded thereon the voice of highest quality is played back and its audio signal is supplied to the said input terminal 1. Concurrently with this, an externally formed control signal or a control signal for the cue signal previously recorded on the master tape is supplied to the input terminal 13 for the other channel. The audio signal supplied to the input terminal 1 is forwarded through the buffer circuit 2 to the PCM converting circuit 4 with a predetermined level and converted therein into a pulse coded signal corresponding to the audio signal of the predetermined frequency and predetermined level. On the other hand, the control signal given to the other input terminal 13 undergoes adjustment of impedance and sensibility and then is shaped by said shaping circuit 16 and supplied to the controller 17. Under the controlling action of said controller 17 for a given period of time, the pulse coded signal from said PCM circuit 4 is stored in the solid memory 5. For effecting reading of said solid memory and reproduction of the cue signal, said controller is operated by an instruction from said instruction circuit 18. The time constant compensating circuit 19 is also actuated with a predetermined time lag, and the pulse signal generated at a predetermined timing relative to the output time of said solid memory 5 is supplied to the cue signal oscillation circuit 20, and the regular cue signals generated with said pulse signal as reference are passed through the buffer amplifier 21 and output terminal 22 so that they are recorded on one of the channel tracks of the slave tape in the slave side recorder. On the other hand, the digital audio signal stored in said solid memory 5 is read out by the timer operation in said controller 17 at a predetermined time which is later than the operation of said controller 17 by said instruction. This audio signal is then converted in the inverse conversion circuit 6 into an analog signal similar to the signal given to said input terminal 1 and is supplied to the output terminal 8 through the buffer amplifier 7. Then said analog audio signal is recorded with high sensibility and excellent frequency characteristic on the other channel track of the slave tape in each slave side recorder connected to said output terminal 8, whereby there can be obtained the dubbing tapes from said respective slave side recorders. These dubbing tapes are then cut out for each cue signal to obtain a plurality of magnetic tapes to be attached to said cards. Thus, the recording pattern on each magnetic tape T recorded by each said slave side recorder is a continuous repetition, with a given time interval, of the audio signal A and cue signal B on one of the channels and the other channel, respectively, as shown in FIG. 2. The solid memory 5 used here must be one which has a sufficient capacity to store said audio signal information, and such memory must be determined by giving consideration to the length of the voice recorded and the frequency characteristic. For instance, in case the audio signal has a frequency of up to 7 KHz and is repeated at a period of 10 seconds, it needs to employ a memory which is capable of storing at least about 140,000-word information. The length $t_1$ of said audio signal is decided by the capacity of said solid memory while the length $t_2$ of the cue signal is decided by the cue signal oscillation circuit 21. Also, the generation timings $t_3$, $t_4$ of the cue signal B relative to the audio signal A and the generation timing (frequency) $t_5$ of the cue signal are set by said compensating circuit 19. In order to increase the dubbing speed for performing the dubbing oepration at high efficiency, it needs to adjust the operation of said compensating circuit 19 in accordance with the increase of the rate of reading from the solid memory 5 by said controller 17.

The slave tape obtained in the manner described above is cut by a cutter operated in correspondence to the cue signal to obtain a multiplicity of magnetic tapes having the same recording contents. In this way, there can be obtained with ease a great many of magnetic cards with excellent sound quality.

What is claimed is:

1. A recording method for a magnetic tape attached to a card, in which an audio signal from a master recorder is pulse coded by a PCM converting circuit and stored in a solid memory of a predetermined capacity, and this stored signal is read out repeatedly by a control signal, again converted into an analog audio signal and recorded on one of the channel tracks of the magnetic tape in each slave side recorder while the cue signal formed at a predetermined timing relative to said audio signal is recorded repeatedly on the other channel track of said magnetic tape.

2. A recording method for a magnetic tape attached to a card as claimed in claim 1, wherein the pulse coded version of the audio signal from the master tape is stored in said solid memory by a control signal obtained from said master tape or by an externally produced control signal.

3. A recording method for a magnetic tape attached to a card as claimed in claim 2, wherein said storing operation is performed with a given time lag by a timer operation of the controller operated by said control signal.

4. A recording method for a magnetic tape attached to a card as claimed in claim 1, wherein reading of the solid memory by said control signal is performed after the operation of the cue signal generating means by a read instruction to said solid memory.

5. A recording method for a magnetic tape attached to a card as claimed in claim 1, wherein the output time of the cue signal given from the cue signal generating means can be adjusted as desired by a time constant compensating circuit.

* * * * *